(12) United States Patent
Frederick, Jr. et al.

(10) Patent No.: US 12,456,682 B2
(45) Date of Patent: Oct. 28, 2025

(54) POWER DISTRIBUTION

(71) Applicant: Arm Limited, Cambridge (GB)

(72) Inventors: Marlin Wayne Frederick, Jr., Austin, TX (US); Karen Lee Delk, Austin, TX (US)

(73) Assignee: Arm Limited, Cambridge (GB)

( * ) Notice: Subject to any disclaimer, the term of this patent is extended or adjusted under 35 U.S.C. 154(b) by 571 days.

(21) Appl. No.: 17/175,640

(22) Filed: Feb. 13, 2021

(65) Prior Publication Data

US 2021/0167013 A1 Jun. 3, 2021

Related U.S. Application Data

(63) Continuation of application No. 15/873,874, filed on Jan. 17, 2018, now Pat. No. 10,923,425.

(60) Provisional application No. 62/448,935, filed on Jan. 20, 2017.

(51) Int. Cl.
| | |
|---|---|
| *H01L 23/528* | (2006.01) |
| *G06F 30/394* | (2020.01) |
| *G06F 30/398* | (2020.01) |
| *H01L 21/66* | (2006.01) |
| *H01L 21/768* | (2006.01) |
| *H01L 23/50* | (2006.01) |
| *H01L 25/00* | (2006.01) |
| *G06F 119/06* | (2020.01) |
| *H01L 21/60* | (2006.01) |

(52) U.S. Cl.
CPC ........ *H01L 23/5286* (2013.01); *G06F 30/394* (2020.01); *G06F 30/398* (2020.01); *H01L 21/76838* (2013.01); *H01L 22/12* (2013.01); *H01L 23/50* (2013.01); *H01L 23/528* (2013.01); *H01L 25/50* (2013.01); *G06F 2119/06* (2020.01); *H01L 21/60* (2021.08)

(58) Field of Classification Search
CPC ............... G06F 30/394; G06F 30/398; H01L 21/76838; H01L 21/0274; H01L 23/5286; H01L 22/12; H01L 23/50; H01L 23/528; H01L 25/50
See application file for complete search history.

(56) References Cited

U.S. PATENT DOCUMENTS

| | | | | |
|---|---|---|---|---|
| 7,943,436 | B2* | 5/2011 | McElvain | G06F 30/394 257/659 |
| 9,946,827 | B2* | 4/2018 | Wang | H01L 29/0653 |
| 2003/0071343 | A1* | 4/2003 | Buffet | H01L 23/5286 257/691 |
| 2011/0014786 | A1* | 1/2011 | Sezginer | G06F 30/394 438/618 |

(Continued)

FOREIGN PATENT DOCUMENTS

TW 201135870 A 10/2011

OTHER PUBLICATIONS

CNIPA Office Action; TW 107102068; Aug. 26, 2023.
(Continued)

*Primary Examiner* — Dale E Page
*Assistant Examiner* — Colleen E Snow
(74) *Attorney, Agent, or Firm* — Pramudji Law Group PLLC; Ari Pramudji

(57) ABSTRACT

An apparatus, a method, and a method of manufacturing an integrated circuit having a metal layer, metal wires within the metal layer being configured such that they have a regular pattern.

12 Claims, 7 Drawing Sheets

(56) References Cited

U.S. PATENT DOCUMENTS

| | | | |
|---|---|---|---|
| 2012/0045901 A1* | 2/2012 | Kim | H01L 21/31144 |
| | | | 257/E21.257 |
| 2014/0210100 A1* | 7/2014 | Xiao | G06F 30/39 |
| | | | 257/774 |
| 2015/0178441 A1 | 6/2015 | Chiu et al. | |
| 2019/0034572 A1* | 1/2019 | Kasprak | H01L 27/0207 |

OTHER PUBLICATIONS

CNIPA Office Action; TW 107102068; Nov. 11, 2022.
TIPO Final Office Action; TW 107102068; Jun. 22, 2022.
TIPO Office Action; TW 107102068; Jul. 6, 2021.

\* cited by examiner

POWER DISTRIBUTION

CROSS-REFERENCE TO RELATED APPLICATIONS

This is a continuation of patent application Number U.S. Ser. No. 15/873,874, filed 2018 Jan. 17, and titled POWER DISTRIBUTION, which application claims the benefit of and priority to Provisional Patent Application No. 62/448,935, filed 2017 Jan. 20, and the disclosure of which are herein incorporated by reference in their entirety.

BACKGROUND

Self-aligned multi-pattern lithography schemes may be used in metal fabrication stages of semiconductor manufacture for efficient power distribution.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

In the description that follows, the scope of the term "some embodiments" is not to be so limited as to mean more than one embodiment, but rather, the scope may include one embodiment, more than one embodiment, or perhaps all embodiments.

Many self-aligned multi-pattern lithography schemes for metal fabrication in semiconductors may depend on a fixed spacer width. This fixed spacer width may limit either the width or space of all metal lines on the layer to a single value with the space typically being a fixed value. In some of these lithography schemes, fixed spacer width rules may refer to a scenario where, although the width of the metal lines may be varied, the space between each line is fixed. This fixed space may be a design parameter which is set by a semiconductor manufacturer, or semiconductor foundry and typically cannot be changed.

Figure 1:
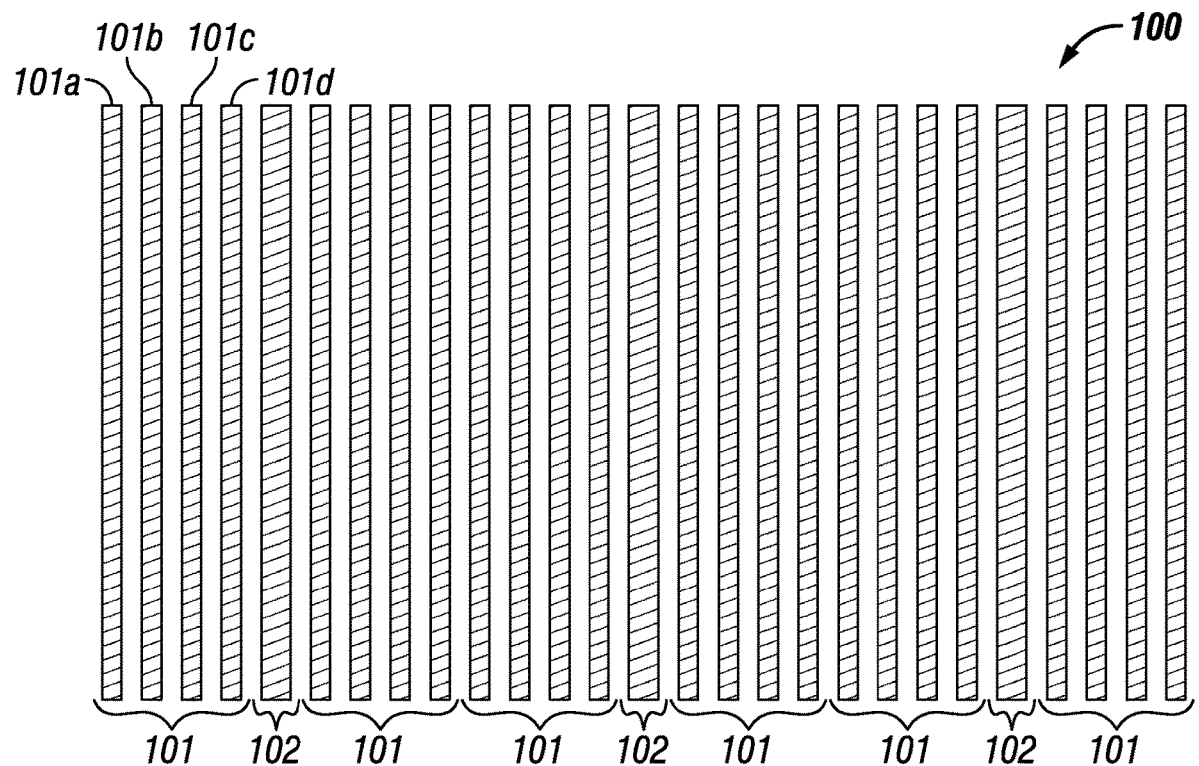
FIG. 1 illustrates a wire width pattern in accordance with various implementations described herein.

In some advanced lithography schemes, many combinations of adjacent and/or next neighbor width may not be compatible with foundry or manufacturing design rules. This may limit available wire patterns and/or result in a high overhead to change collections of widths. Combinations of widths which are compatible with foundry rules may be referred to as a pattern. An example of a wire width pattern is shown in FIG. 1. In FIG. 1, the pattern 100 is formed from a set of 4 thinner wires (101a, 101b, 101c, 101d) and one wider wire (102). The pattern may comprise 4 thin (101), one wide (102), 4 thin (101), 4 thin (101) one wide (102), 4 thin (101), 4 thin (101) one wide (102), 4 thin (101).

As can be seen in FIG. 1, although the width of the metal lines may be varied, the width of the spacing between each metal line is fixed.

In some embodiments, the narrow metal lines in this pattern may be used for signal routing, and the wider metals may be used for supply voltages. Each metal shape in the pattern may be thought of as a metal track of a given width when applying this concept to automated place and route technology. In the pattern above, each metal track may only be one net, or in other words, each metal track is uncut and can only be used to route one signal. It may be beneficial to break a track into multiple nets using a block or cut mask to create two or more unconnected structures.

Figure 2:
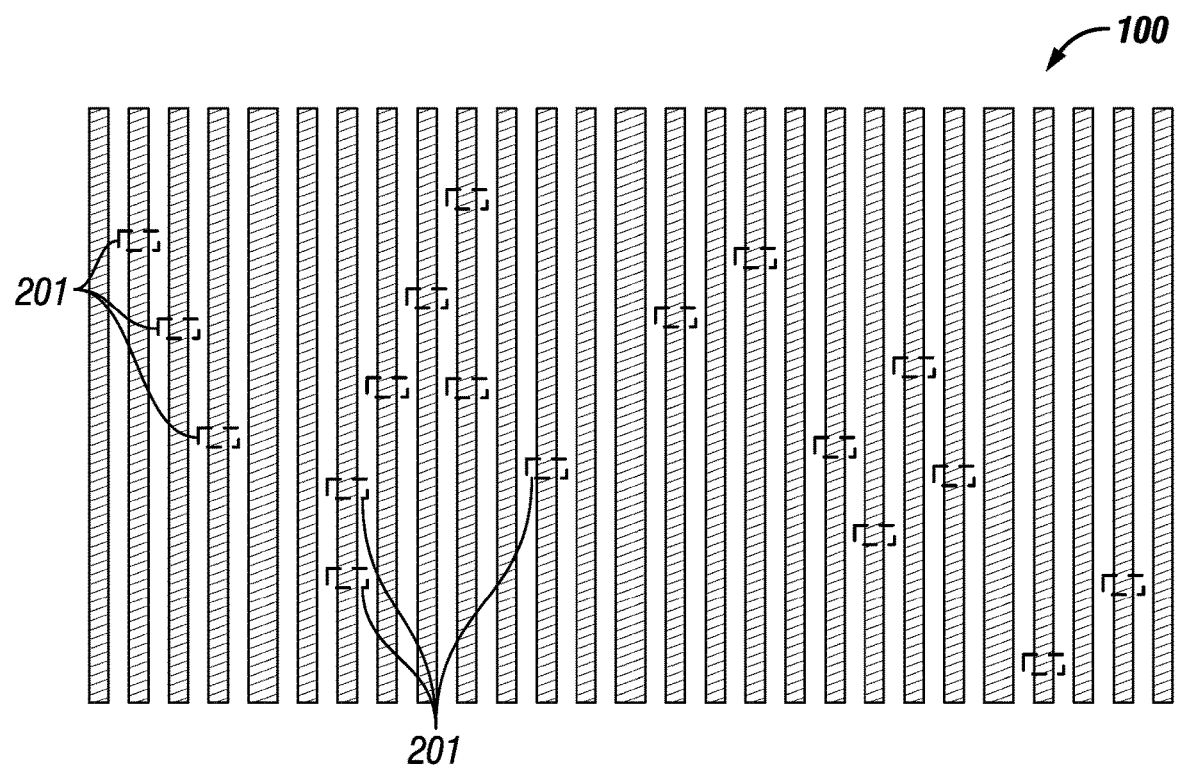
FIG. 2 illustrates the pattern of FIG. 1 with a block mask applied to the pattern in accordance with various implementations described herein.

FIG. 2 shows an example pattern 100, where a block mask has been applied to an original metal pattern. Each small mask rectangle 201 prevents metal from forming where it overlaps with the metal pattern. This separates each track into two or more sections or nets. In some embodiments, this lithography technique may result in a small end-to-end spacing. This may be because the metal is cut into multiple nets instead of directly printing the metals with a substantially small separation between line ends.

Figure 3:
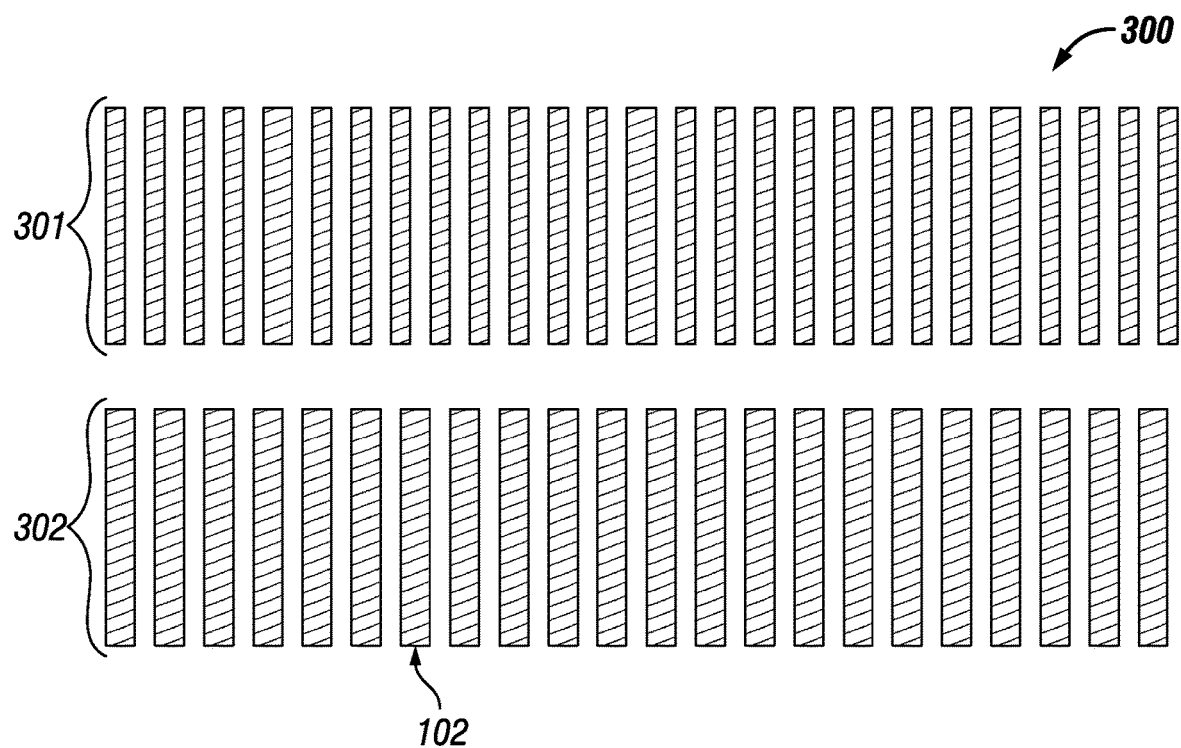
FIG. 3 illustrates a wire width pattern in accordance with various implementations described herein.

FIG. 3 shows an example pattern (300) where the top half (301) of the pattern is different from the bottom half (302). The top half may be the same pattern as shown in FIGS. 1 and 2 whilst the bottom half may comprise multiple wide tracks (102), such as, e.g., 21. Space defined multi-patterning methods may not be used to create this pattern (300) as the end lines may have to be created from the cut mask. This means that it may not be possible to simply separate patterns with space as shown, e.g., in FIG. 3.

It can be seen in FIG. 3 that the fixed spacing rule results in an offset between the wires in the upper half (301) of the pattern and the lower half (302) of the pattern.

Figure 4:
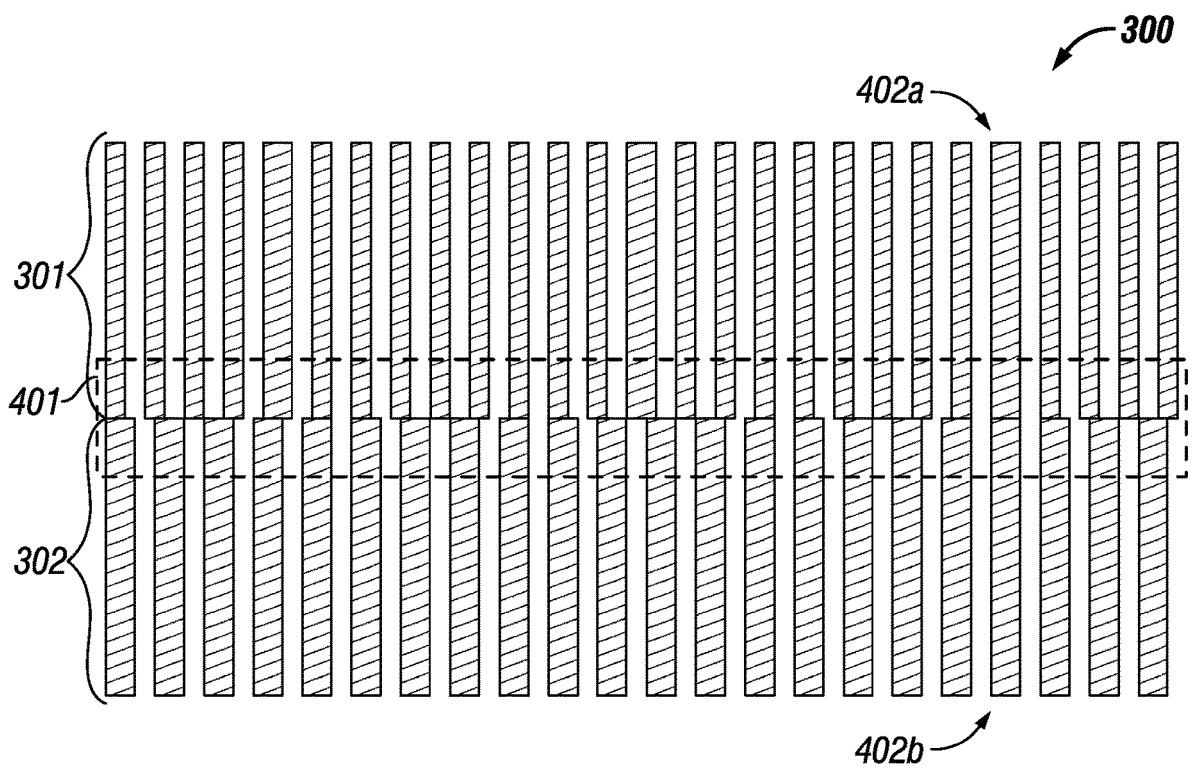
FIG. 4 illustrates the pattern of FIG. 3 with a larger cut mask in accordance with various implementations described herein.

FIG. 4 shows the pattern (300) with a larger cut mask (401) which may be used to change patterns. This large cut mask may be referred to as a mandrel change or a large end-to-end cut. This large cut may remove any ill formed structures related to the non-uniform interaction of the two patterns.

Large end-to-end may need to be substantially large which may result in a gap of routing resources. This gap may be greater than the size of logic cells in the technology, which may result in the need to remove whole rows of logic that would potentially have to be removed in order to access pins as required. Further, as there is no structure that connects from the upper section to the lower section, connectivity may be lost across this boundary on this layer where a mandrel change occurred. Although the wide metal (402a) furthest to the right in the top half (301) of the pattern (300) is aligned with one of the wide metals (402b) of the bottom half (302) of the pattern (300), continuous cut mask lithography rarely allows a small gap like this for these large size geometries, and therefore, it should be cut.

When distributing power to a region, there are a few considerations which may need to be taken into account. First, all portions of the region may require a lower resistance connection to the voltage regulator. Second, there may be a mixture of more than one voltage regulator in a design, and the second voltage is commonly only needed in a small subset of the total design area. Third, floor planning obstructions, such as, e.g., memories, may interrupt an otherwise uniform power grid. Fourth, the power network may need much wider than minimum nets to meet the resistance parameters for functionality and performance goals to be met.

Figure 5:
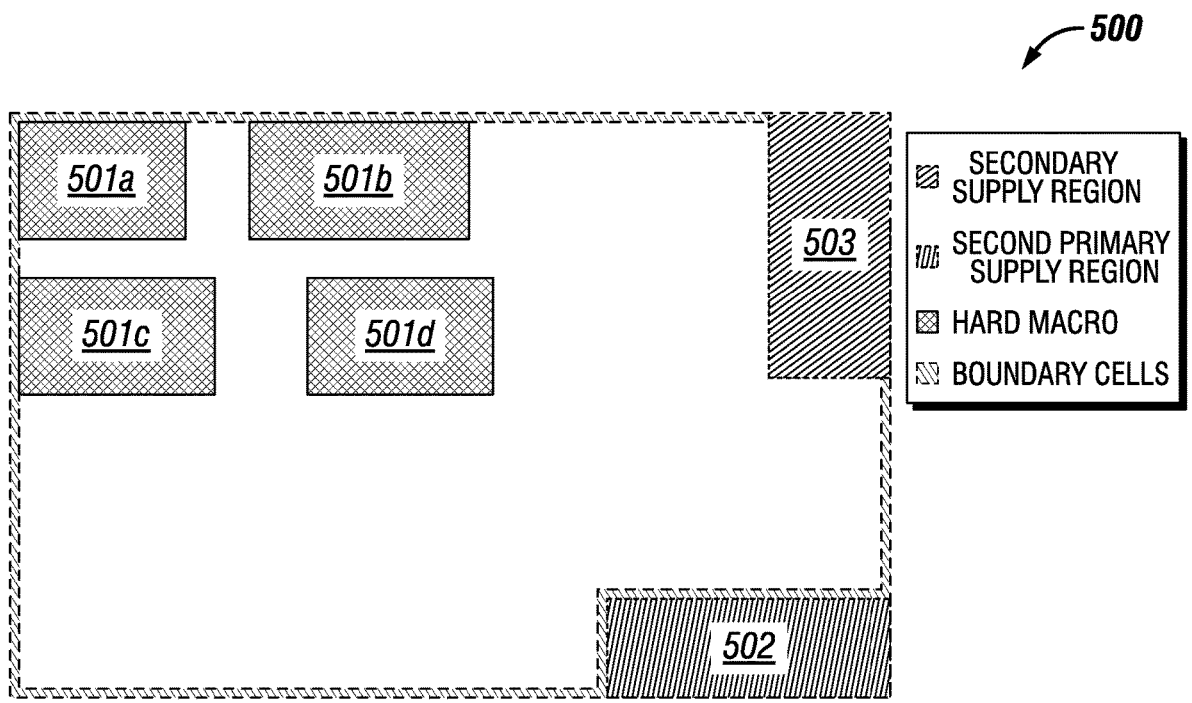
FIG. 5 illustrates a typical block floorplan in accordance with various implementations described herein.

FIG. 5 shows a block floorplan (500). The block floorplan (500) may comprise multiple hard macro blockages, such as, e.g., four hard macro blockages (501a, 502b, 501c, 501d), a primary power supply region (502), and a secondary supply region (503)

Figure 6:
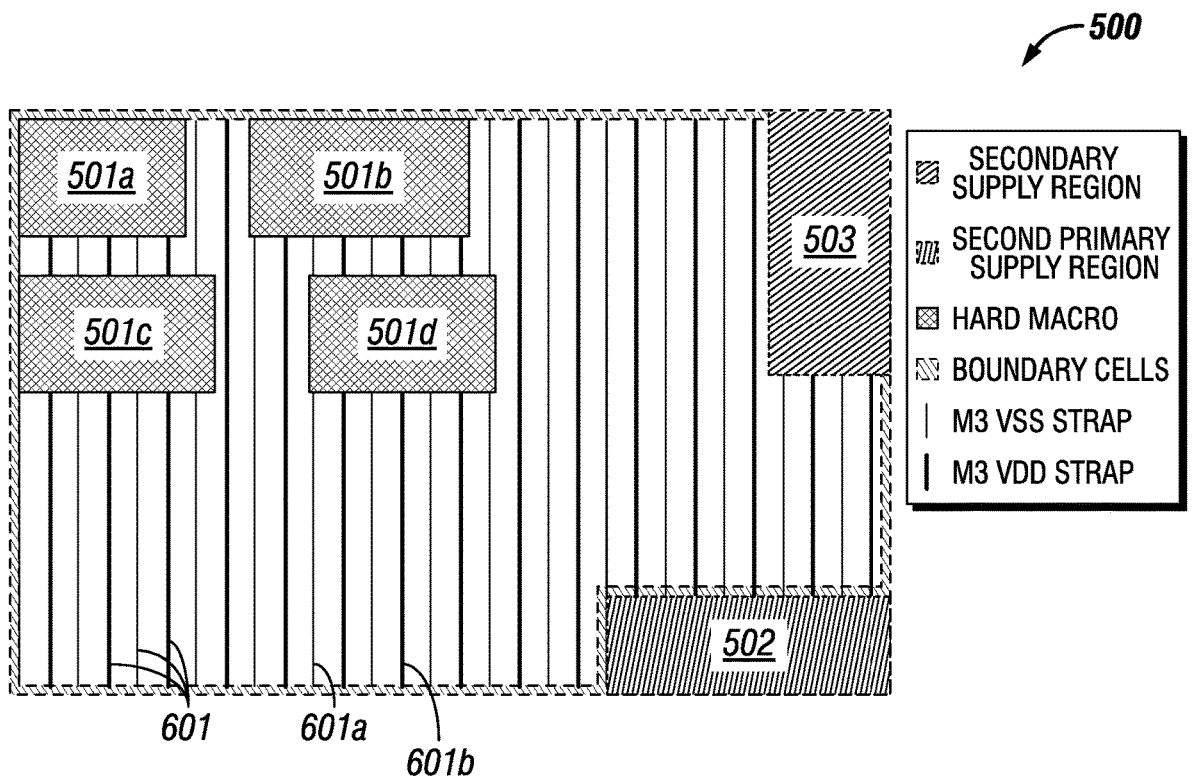
FIG. 6 illustrates a uniform metal/track pattern inserted over the design of FIG. 5 in accordance with various implementations described herein.

FIG. 6 shows the block floorplan (500) of FIG. 5 with a uniform metal/track pattern of wider power tracks (601) inserted over the design. The wider power tracks (601) may comprise Vss tracks or straps (601a) and Vdd tracks or straps (601b). The signal tracks have been omitted for clarity.

In some embodiments, alignment of this uniform power pattern may not comply with foundry design rules. For example, if the design rules require the maximum allowable span between like nets (601) in FIG. 6 to be half the distance of the uniform pattern, then there may be cases at the edges of the hard macros (501) where this maximum distance may be exceeded. Additionally or alternatively, some redundancy may be needed when connecting regions including the small channels in between the hard macros. Further, the second primary supply region (502) in the bottom right corner may disrupt the supply distribution in a manner similar to the hard macros, except the second primary supply region itself may also need power distribution.

Figure 7:
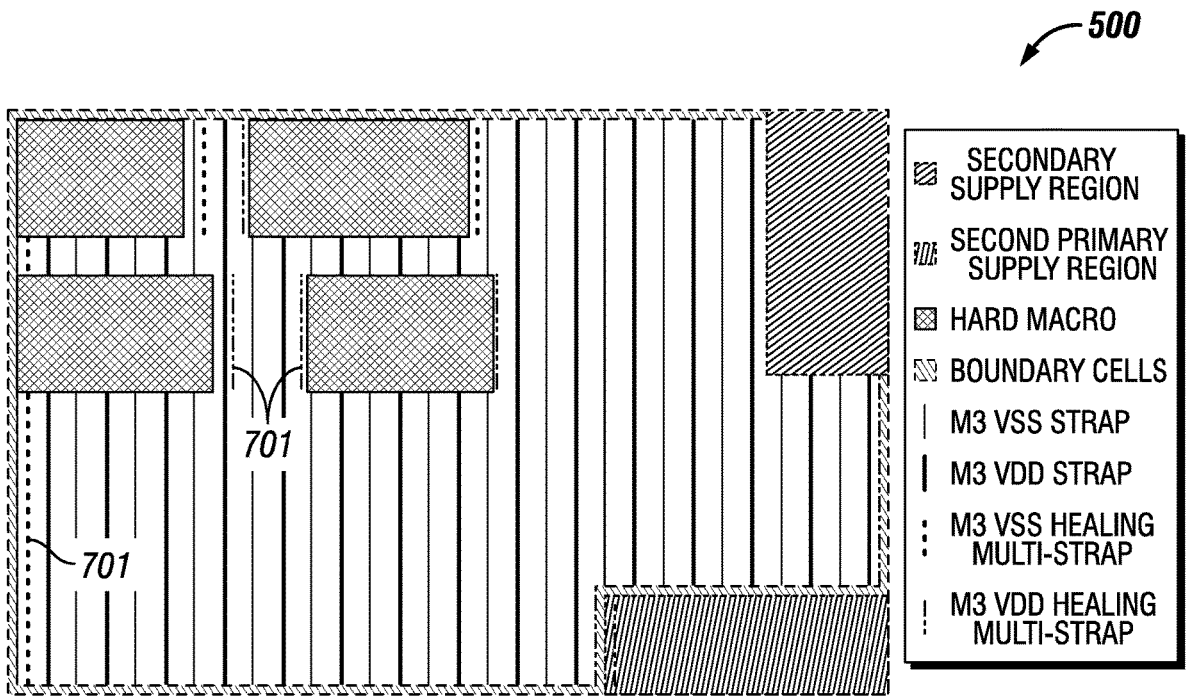
FIG. 7 illustrates the pattern of FIG. 6 with additional power straps in the irregular areas in accordance with various implementations described herein.

In some embodiments, these deficiencies in power delivery may be addressed by adding in one or more additional power straps (701) in irregular areas, e.g., as shown in FIG. 7. In some embodiments, as these healing straps may need to be wider to meet resistance and electromigration reasons, they may result in an offset to the patterns in that region. This may ripple across the design and affect how the band is defined by the height of the healing strap. These additional straps or wires may be referred to as discontinuities, because they may change the metal wiring pattern.

Figure 8:
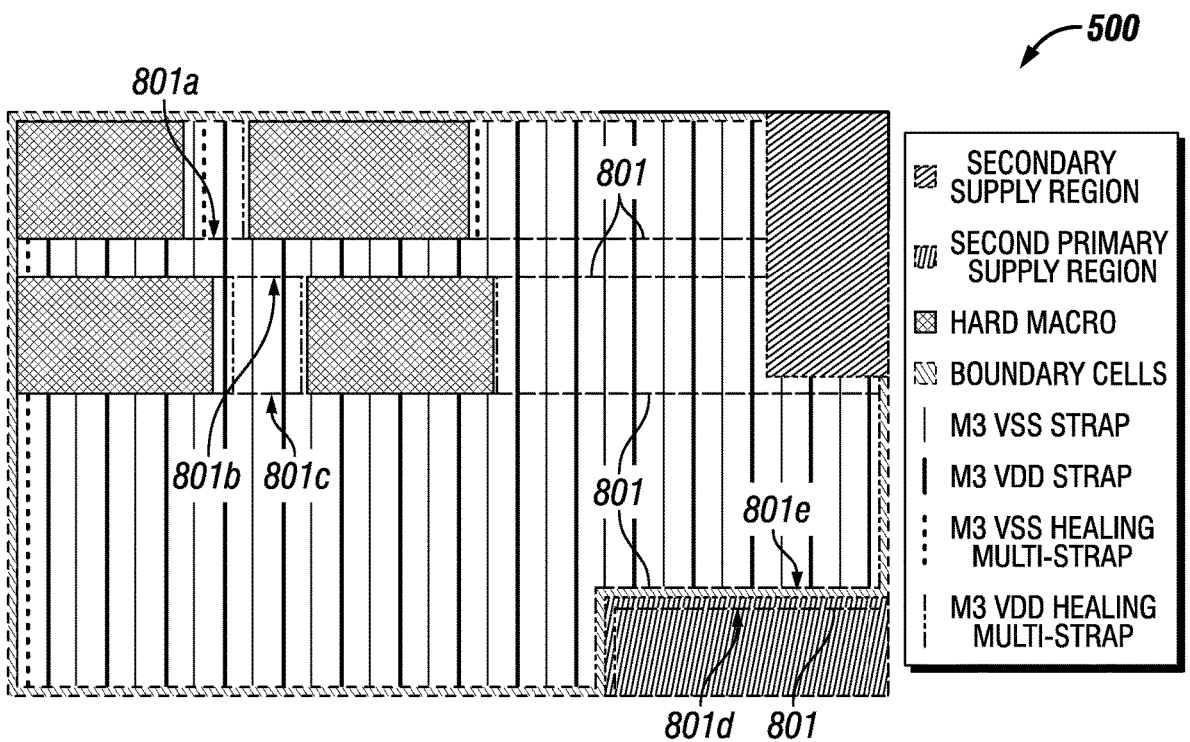
FIG. 8 illustrates the pattern of FIG. 7 with a mandrel change in accordance with various implementations described herein.

FIG. 8 shows the floor plan (500) with multiple discontinuities, such as, e.g., 5 discontinuities, within the wire layout (801a, 801b, 801c, 801d, 801e), which may be needed to resolve the conflict created by the offset patterns. As three of these discontinuities (801a, 801b 801c) may break connectivity on a layer along the discontinuity, this example layer may be cut apart into small regions which may have a severe negative impact on the routability of signals through the metal layer. Further, these discontinuities may refer to a scenario where the power straps themselves may not be continuous. This may impact the power supply resistance and, in some cases, power distribution efficiency.

One approach which may avoid this situation involves inserting one or more metal lines than are needed to meet IR drop requirements or restricting the hard macro size and placement to insure the smallest of channels may still have an adequate amount of supply. The power regions may also have similar restrictions on their size and placement. In some examples, the number of metal lines may be double the number of metal lines that may be actually needed. This may be a simple approach, but may result in a loss of density, as area is either wasted in the channels between hard macros or by blocking of lots of routing resource due to the uniformly over designed power grid reducing the utilization factors across the design. There may also be difficulties in designing layouts using the increased density of metal lines.

Figure 9:
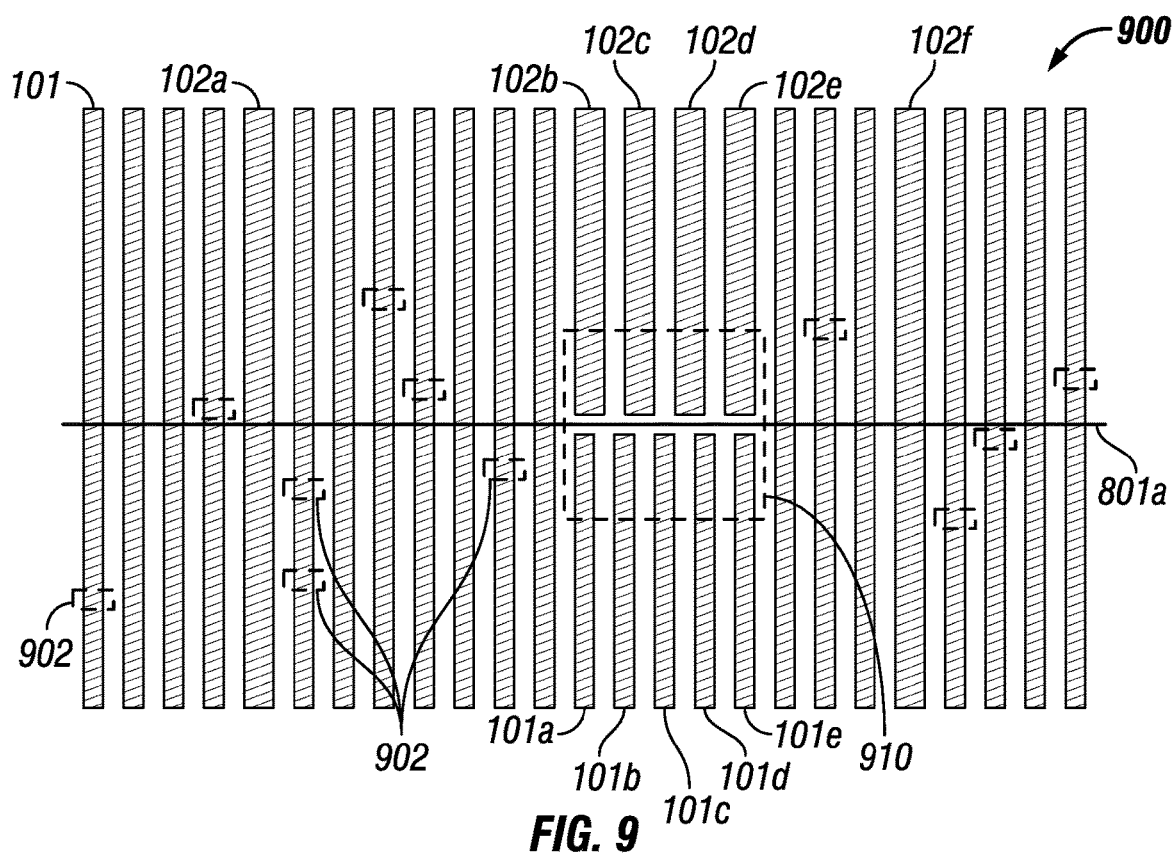
FIG. 9 illustrates local track pattern adjustment in accordance with various implementations described herein.

Another approach may involve adjusting the track pattern locally each time an extra power strap is inserted to return to the nominal track pattern as soon as possible. FIG. 9 shows a wire pattern 900. The pattern may comprise multiple thin wires, such as, e.g., four thin wires (101), followed by one wide wire (102a) and followed by seven thin wires (101), and followed by a separation area (910) where the upper and lower sections of the pattern have different wire patterns. The upper section may comprise four wide wires (102b, 102c, 102d, 102e), and the lower section may comprise 5 thin wires (101a, 101b, 101c, 101d, 101e). The pattern then reunifies and continues with three thin wires (101) followed by one wide wire (102f) and followed by four thin wires (101). The two outer wide wires (102b, 102f) are supply wires. One of the inner wide wires (102b) is an extra supply net. The other three wide wires are signal wires (102c, 102d, 102e). The pattern further may comprise a block mask (902) and a transitional cut (801a). The block mask (902) may comprise a plurality of small masks). The transitional cut (801a) may be needed due to the disturbance in the regularity of the wire pattern. This is caused by the extra supply net (102b) which may be needed for the design.

The number of thick wires (102) and narrow wires (101) used in the separation area (910) may depend on the width of the wide and thin wires and the fixed width of the spacer. The regularity of the pattern may be quickly recovered, using broad wires for the signals after a local disturbance caused by the extra supply net requirement.

The use of the separation area (910) may avoid the mandrel offset transition overhead across the entire track pattern. In the example, only five of the nominal pattern signal tracks are cut by the mandrel change. This may result in the wide signal tracks negatively impacting the router, resulting in performance loss due to the track assignment phase not being able to optimize which nets are assigned to which track as the higher capacitance and lower resistance is unexpected. Further, there may still be a loss of route porosity from the wider tracks and from the idea that the large end-to-end cut usually needs some special restrictions on the continuous tracks immediately to the left and right of the cut geometry (e.g., for vertical running metal).

Additionally, the three fat signal tracks (102c, 102d, 102e) may not connect to the region below the red line which may result in a loss of routing resource. Further, the large end-to-end region may result in blocking placement of a cell where the region exists. Also, it may be difficult to find patterns that will return disturbed regions back to the nominal pattern when multiple disturbed regions are interacting; especially, when a special restriction on the wire track to the left and right of the large end-to-end cut is usually for the track to be wider than a signal track.

Figure 10:
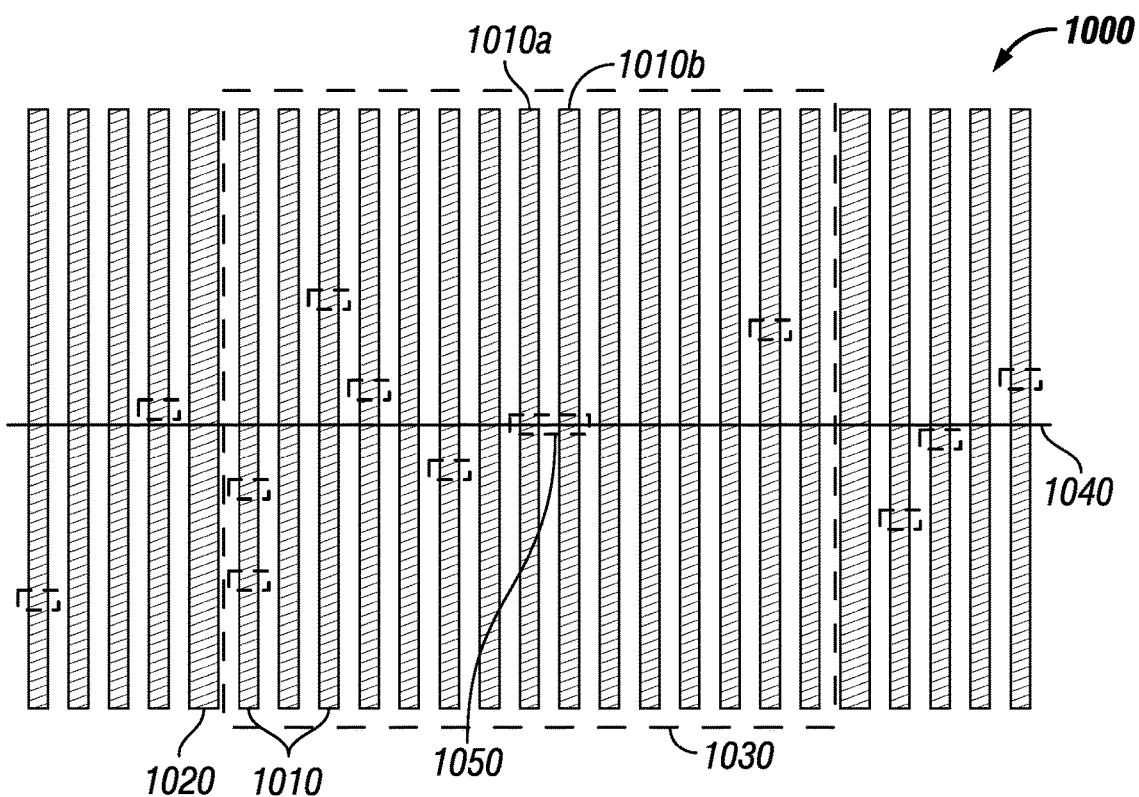
FIG. 10 illustrates a track pattern in accordance with various implementations described herein.

FIG. 10 shows a track pattern 1000 in accordance with some embodiments. The region shown in FIG. 10 may be considered to be a small part of FIG. 8 focused on one of the discontinuity lines 801.

In FIG. 10, track pattern 1000 may comprise 4 thin wires (1010) followed by one wide wire (1020), followed by 15 thin wires (1010) in a grouping (1030) followed by one wide wire (1020) followed by 4 thin wires (1010). The two wide wires (1020) are supply wires. The eighth (1010a) and ninth (1010b) thin wires located within the 15 thin wire grouping (1030) are extra supply nets.

In some embodiments, these two extra supply wires (1010a, 1010b) may be multi-strap wires which are coupled together to provide the equivalent characteristics of one wide wire. Track pattern 1000 may comprise a block mask 1030 and shows a mandrel change line 1040. Area 1050 shows where a cut is avoided across the eighth (1010a) and ninth (1010b) thin wires.

In FIG. 10, the uniform track pattern of FIG. 6 is used in the region needing an extra supply net. In some embodiments, this means that for the majority of the design, the low resistance supply is insured by traditional wide supply wires embedded within tight pitch signal wires for high routing utilizations. This may take advantage of the ability of the spacer based self-aligned multi-pattern lithography's to print relatively wide wires adjacent to minimum pitch wires. Instead of over inserting these wide wires to insure good supply integrity, healing straps may be added in some embodiments. These healing straps, which replace the wide wires, may comprise two or more signal nets coupled together in a parallel multi-strap configuration.

In some embodiments, an area or region of a metal layer may comprise a plurality of metal conducting paths with different widths and lengths, and the area or region of a metal layer may be replaced with a set of uniform metal paths that may have a same width and equidistantly spaced. These uniform paths may then be coupled together to replicate the original path design parameters. In some embodiments, these uniform paths may then be cut using a block mask.

In some embodiments, the parallel signal net width supply straps may be adjacent. In some embodiments, they may have one or more signal nets between them. In some embodiments, the position of signal net, the individual straps forming the multi-strap healing straps, and the multi-strap healing straps may be dependent on the design rules associated with line ends of the metal and with via formation.

In some embodiments, the wiring pattern in a region surrounding a disturbance may be analyzed, and a uniform pattern that matches the whole area may be used across the area. Where the uniform pattern results in a wire being too narrow for the design parameters, for example, a supply net (which requires a wide wire) being routed in the an area where the pattern only has narrow wires, two of the narrow wires are coupled together to form an equivalent wide wire.

Applying embodiments to each region of a metal layer having a discontinuity in the wiring pattern may reduce a number of mandrel cuts needed for that layer and, in some instances, may remove the need for mandrel cuts completely. Some embodiments may simplify the routing of signal wires and simplify the distribution of power across the metal layer. Some embodiments may also increase the number of metal nets which can be included within a metal layer. Some embodiments may increase the area available for logic circuitry in adjacent layers.

In the embodiment shown in FIG. 10, the total number of signal nets in the healed supply region may be the same as in FIG. 9.

In some embodiments, all the signal nets may be continuous across the region boundary except for the two nets used for healing the supply.

In some embodiments, there may be no need to be concerned about special track widths being needed to border the large end-to-end cut. This may be because there are no large end-to-end cuts needed due to there being no pattern variation across the entire design.

In some embodiments, the lack of pattern variation may simplify the implementation of track pattern designs.

In some embodiments, there may be no need to strongly constrain the size of and spacing between hard macros and/or insert excessive supply nets into the uniform pattern to account for disturbances in the distribution. In some embodiments, this may result in smaller block area from higher utilizations and/or less dead area between hard macros.

In some embodiments, the signal nets in the healed supply region may be of uniform width, and this may result in there being no negative impact on the place and route flows.

Some embodiments may replace track patterns integrated circuits. In some embodiments, these may be boundary cells for hard macro areas, primary supply regions, secondary supply regions, or any other area of the integrated circuit design. Some embodiments may be used in metal layers disposed within the integrated circuit.

Some embodiments may comprise an extra power strap for a second voltage regular in the secondary supply region. Some embodiments may enable power to be delivered to power gate placed in a fine grain checker board across the entire design.

Although the embodiment in shown in FIG. 10 uses a simple substitution pattern only using thin nets, the substitution pattern in some embodiments may have a combination of thinner and thicker nets, or only thicker nets if that pattern is the most commonly used pattern within the substitution area.

In some embodiments the integrated circuit may be a three-dimensional integrated circuit (3DIC).

In some embodiments, three or more widths of wire may be used. In such embodiments, two or more narrower wires may be coupled together to form wider wires. In some embodiments, the width ratio of the narrow and wide wires may result in two or more narrow wires coupled being coupled together to form a wider wire.

In some embodiments, each power gate may create its own unique secondary power supply region.

The terms wire, net, healing straps and straps have been used interchangeably. It will be appreciated that these terms may refer to a conducting path disposed within a metal layer of an integrated circuit.

Some embodiments may provide an apparatus, a method, and a method of manufacturing an integrated circuit having a metal layer, wherein metal wires within the metal layer being configured such that they may have a regular pattern.

Figure 12:
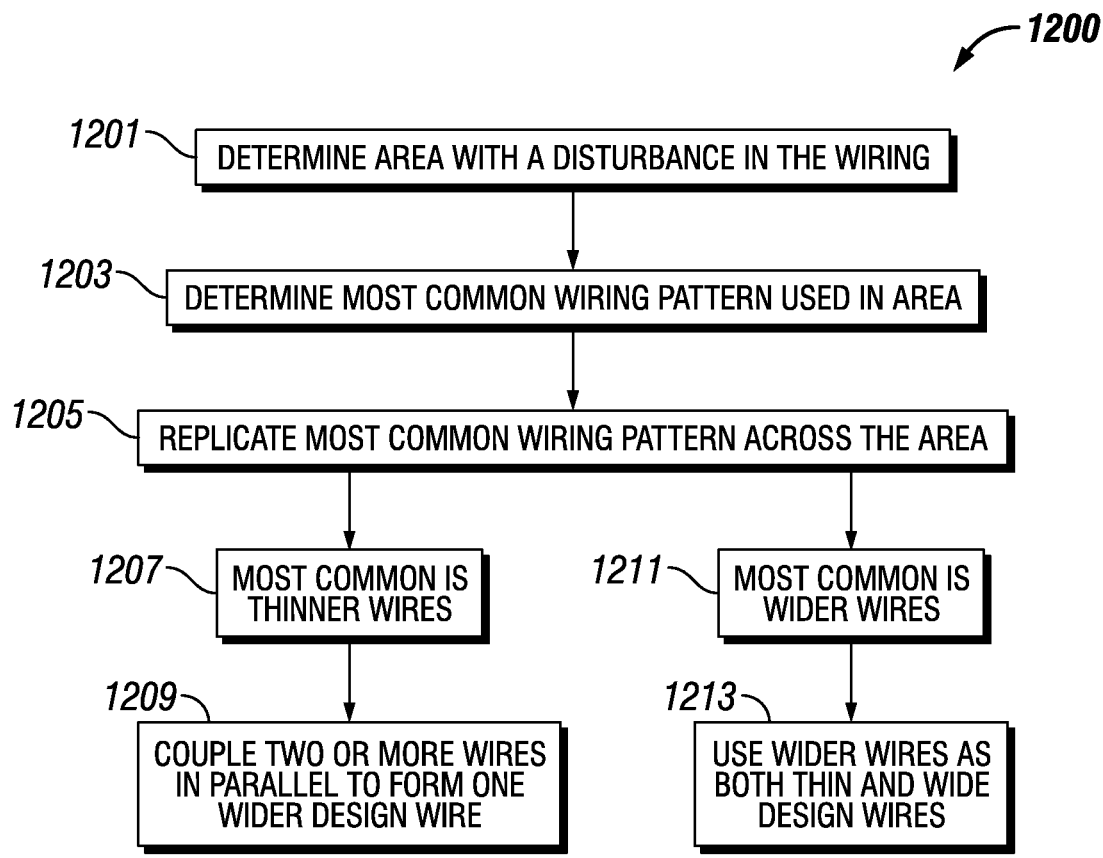
FIG. 12 illustrates a method in accordance with various implementations described herein.

FIG. 12 shows a method 1200 in performed by some embodiments. At 1201, an area with a disturbance in the wiring layout pattern is determined. At 1203, the most common wiring pattern that may be used within the disturbance area and, optionally, an area surrounding the disturbance is determined. At 1205, the determined most common wiring pattern is replicated across the entire disturbance area. This may include the optional surrounding area. At 1207, the most common wiring pattern may use thinner wires. In such circumstances, at 1209, two or more wires are coupled in parallel to form one wider design wire. At 1211, the most common wiring pattern may use wider wires. In such circumstances, at 1213, wider wires are used for the thin and wider design wires.

In some embodiments, at 1209, the coupled wires may be next or adjacent to one another. In some embodiments, at 1209, the coupled wires may be separated by one or more wires. The selection of whether to couple adjacent or separated wires may be dependent on the characteristics process used by the semiconductor foundry where the integrated circuit is being manufactured.

Figure 13:
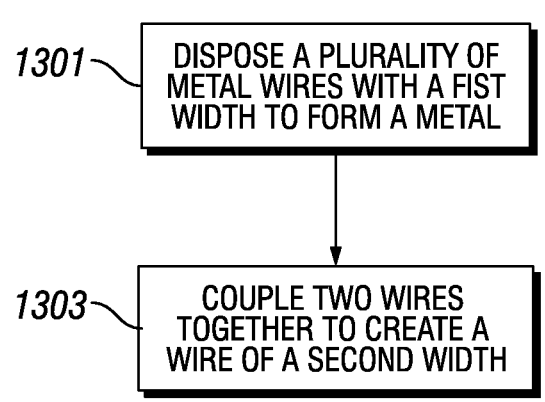
FIG. 13 illustrates a method of manufacturing an integrated circuit in accordance with various implementations described herein.

FIG. 13 shows a method of manufacturing a metal layer 1300 in accordance with some embodiments. At 1301, metal wires having a first width are disposed to form a metal layer. At 1303, two wires are coupled together to create a second wider wire.

It will be appreciated that, in some embodiments, the method of FIG. 13 may form part of a larger manufacturing process which may comprise a plurality of processes including disposing, etching and masking. When combined, these processes may create an integrated circuit comprising at least one metal layer and at least one of at least one silicon layer, at least one diffusion layer, at least one cut layer, at least one oxide layer, at least one pattern resist layer, at least one via layer, at least one photolithographic layer, at least one insulation layer, at least one nitride layer and/or at least one block mask layer. Some embodiments may use at least one of the manufacturing method and design method in order to manufacture one or more metal layers.

Figure 11:
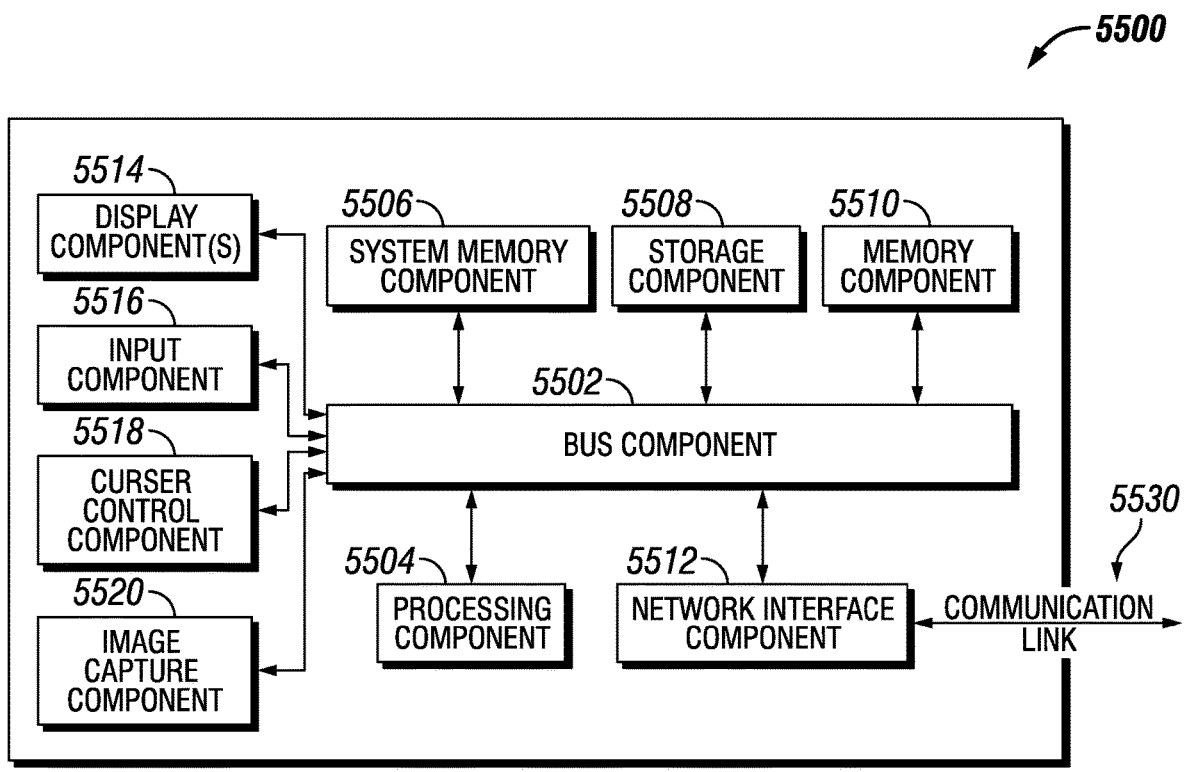
FIG. 11 illustrates a block diagram of a computing device in accordance with various implementations described herein.

FIG. 11 is a block diagram of a computing device 5500 suitable for implementing various implementations described herein, including, e.g., the computing device 5102 and components associated therewith in FIG. 1. As such, the computing device 5500 may be embodied as the computing device 5102 and be configured for network communication with various other computing devices over a wired or wireless network.

The computer device 5500 may be implemented as various types of computing devices, such as, e.g., a server, a personal computer (PC), a laptop, a notebook, a mobile communication device, or similar. The computer device 5500 may include a bus 5502 (or other communication mechanism for communicating information) that interconnects the various subsystems and/or components, such as, e.g., processing component 5504 (e.g., processor, digital signal processor (DSP), etc.), system memory component 5506 (e.g., RAM), static storage component 5508 (e.g., ROM), disk drive component 5510 (e.g., magnetic or optical), network interface component 5512 (e.g., modem or Ethernet card), display component 5514 (e.g., CRT or LCD), input component 5516 (e.g., keyboard), cursor control component 5518 (e.g., mouse or trackball), and image capture component 5520 (e.g., analog or digital camera). In some implementations, disk drive component 5510 may comprise a database having one or more disk drive components.

The computer device 5500 performs various specific operations by processor 5504 executing one or more sequences of one or more instructions contained in system memory component 5506. Such instructions may be read into system memory component 5506 from another computer readable medium, such as static storage component 5508 or disk drive component 5510. In some cases, hard-wired circuitry may be used in place of or in combination with software instructions to implement the various schemes and/or techniques described herein.

Logic may be encoded in a computer readable medium, which may refer to any medium that participates in providing instructions to processor 5504 for execution. Such a medium may take many forms, including but not limited to, non-volatile media and volatile media. In various implementations, non-volatile media includes optical or magnetic disks, such as disk drive component 5510, and volatile media includes dynamic memory, such as system memory component 5506. In some implementations, data and information related to execution instructions may be transmitted to computer device 5500 via a transmission media, such as in the form of acoustic or light waves, including those generated during radio wave and infrared data communications. In various implementations, transmission media may include coaxial cables, copper wire, and/or fiber optics, including wires that comprise bus 5502.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various implementations, execution of instruction sequences to practice the schemes and techniques described herein may be performed by computer device 5500. In other implementations described herein, a plurality of computer systems 5500 coupled by communication link 5530 (e.g., LAN, WLAN, PT SN, and/or various other wired or wireless networks, including telecommunications, mobile, and/or cellular phone networks) may perform instruction sequences to practice implementations of the present disclosure in coordination with one another.

In various implementations, the computer device 5500 may transmit and receive messages, data, information and instructions, including programs (i.e., application code) through communication link 5530 and communication interface 5512. Further, the received program code may be executed by the processor 5504 as received and/or stored in disk drive component 5510 or some other non-volatile storage component for execution.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims. It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

There is provided an apparatus comprising: at least one metal layer comprising: a plurality of first wires of a first width; and a plurality of second wires of a second width; and wherein at least two of the plurality of second wires are coupled together.

There is provided a metal layer comprising: a plurality of first wires of a first width; and a plurality of second wires of a second width; and wherein at least two of the plurality of second wires are coupled together.

There is provided a method comprising: determining an area of a metal layer having a discontinuity of metal wires; selecting a subset of a pattern of metal wires in the area; repeating the pattern subset across the area of the metal layer; and coupling at least two of the metal wires.

The subset pattern may be selected in dependence on a frequency of occurrence across the area.

There is provided a method comprising: determining within an area of a metal layer comprising at least one first wire having a first width and at least one second wires having a second width, a first wire requiring a cut; replacing the at least one first wire having a first width and at least one second wire having a second width with a plurality of third wires having a third width and being spaced equidistantly; and coupling at least two of the third wires together to replicate said at least one first wire.

The second width and the third width may be the same.

The wires may be spaced equidistantly.

A computer program product may be configured to perform the method.

There is provided an apparatus comprising: at least one metal layer comprising a first region comprising a plurality of first wires of a first width; and wherein at least two of the plurality of first wires are coupled together.

There is provided at a metal layer comprising: a first region comprising: a plurality of first wires of a first width; and wherein at least two of the plurality of first wires are coupled together.

The metal layer of claim may further comprising a second region comprising at least one second wire of a second width.

The at least two of the plurality of first wires coupled together have substantially similar characteristics to the second wire.

The wires may be spaced equidistantly.

There is provided a method for method of manufacturing an integrated circuit comprising: disposing a plurality of first metal wires having a first width wires within a metal layer; and coupling two of the plurality of first metal wires together to provide a second metal wire having a second width.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described herein are disclosed as example forms of implementing the claims.

What is claimed is:

1. A method comprising:
   determining a first area within a metal layer having first wires with first widths and second wires with second widths that are less than the first widths;
   determining a second area within the metal layer, and in the second area, replacing the first wires and the second wires with a plurality of third wires having a third width that is similar to the second widths; and
   coupling at least two of the third wires together so as to replicate a respective first wire.

2. The method of claim 1, further comprising:
   avoiding a cut to the respective first wire by replicating the respective first wire with the at least two of the third wires coupled together.

3. The method of claim 1, wherein:
   the respective first wire refers to a supply wire,
   the at least two of the third wires refer to extra supply wires that provide for multi-strap wires coupled together so as to provide equivalent characteristics of the supply wire.

4. The method of claim 3, wherein:
   the multi-strap wires refer to healing straps that use two or more of the extra supply wires coupled together in a parallel multi-strap configuration.

5. A method comprising:
   determining first wires in a metal layer, the first wires having a first width;
   replacing at least two of the first wires with a second wire having a second width that is greater than the first width, and
   manufacturing, or causing to be manufactured, an integrated circuit having the remaining first wires and the second wire.

6. The method of claim 5, wherein the second wire is a supply wire.

7. The method of claim 5, wherein:
   the second wire includes multi-strap wires that are coupled together to provide equivalent characteristics of a supply wire.

8. The method of claim 7, wherein:
   the multi-strap wires replace at least the two of the first wires and are coupled together in a parallel multi-strap configuration.

9. An apparatus comprising:
   at least one metal layer having a plurality of wires including first wires having a first width, wherein at least two of the first wires are replaced with a second wire having a second width that is greater than the first width, and wherein the second wire and remaining first wires are disposed within an integrated circuit.

10. The apparatus of claim 9, wherein:
    the second wire refers to a supply wire.

11. The apparatus of claim 9, wherein:
    the second wire includes multi-strap wires that are coupled together so as to provide equivalent characteristics of a supply wire.

12. The apparatus of claim 11, wherein:
    the multi-strap wires use at least the two of the first wires and are coupled together in a parallel multi-strap configuration.

\* \* \* \* \*